United States Patent
Agara Venkatesha Rao et al.

(10) Patent No.: US 10,304,172 B2
(45) Date of Patent: May 28, 2019

(54) OPTICAL CENTER DETECTION IN PLENOPTIC IMAGING SYSTEMS

(71) Applicants: Krishna Prasad Agara Venkatesha Rao, Bangalore (IN); Srinidhi Srinivasa, Bangalore (IN)

(72) Inventors: Krishna Prasad Agara Venkatesha Rao, Bangalore (IN); Srinidhi Srinivasa, Bangalore (IN)

(73) Assignee: Ricoh Company, Ltd., Tokyo (JP)

(*) Notice: Subject to any disclaimer, the term of this patent is extended or adjusted under 35 U.S.C. 154(b) by 58 days.

(21) Appl. No.: 15/610,773

(22) Filed: Jun. 1, 2017

(65) Prior Publication Data

US 2018/0350049 A1 Dec. 6, 2018

(51) Int. Cl.
*G06T 5/20* (2006.01)
*G06T 5/00* (2006.01)
*G06T 5/40* (2006.01)

(52) U.S. Cl.
CPC ............... *G06T 5/20* (2013.01); *G06T 5/002* (2013.01); *G06T 5/40* (2013.01)

(58) Field of Classification Search
CPC .............. G06T 5/20; G06T 5/40; G06T 5/002
See application file for complete search history.

(56) References Cited

U.S. PATENT DOCUMENTS

| | | | | |
|---|---|---|---|---|
| 2010/0053195 A1* | 3/2010 | Harada | .................... | G06T 5/009 345/589 |
| 2011/0122308 A1* | 5/2011 | Duparre | ............ | H01L 27/14621 348/340 |
| 2012/0300091 A1* | 11/2012 | Shroff | ................ | H04N 5/23212 348/222.1 |
| 2013/0038749 A1* | 2/2013 | Hatakeyama | ........... | G06T 5/003 348/222.1 |
| 2013/0127901 A1* | 5/2013 | Georgiev | ............. | H04N 17/002 345/620 |
| 2014/0003732 A1* | 1/2014 | Le Floch | ................ | G06T 9/007 382/233 |
| 2014/0146184 A1* | 5/2014 | Meng | .................... | H04N 17/002 348/187 |
| 2015/0146032 A1* | 5/2015 | Rime | ....................... | H04N 7/01 348/222.1 |
| 2015/0215604 A1* | 7/2015 | Tosic | .................... | H04N 13/232 348/46 |
| 2016/0202048 A1* | 7/2016 | Meng | ................... | H04N 13/232 348/136 |
| 2016/0260205 A1* | 9/2016 | Namboodiri | .............. | G06T 7/80 |

* cited by examiner

*Primary Examiner* — Ming Y Hon
(74) *Attorney, Agent, or Firm* — Fenwick & West LLP

(57) ABSTRACT

The location of the optical axis of a plenoptic imaging system is determined. In one approach, the plenoptic image is noise filtered, down-sampled, low-pass filtered, and again noise filtered. Slices through this image that have the highest power are used to determine the location of the optical axis. Once the location of the optical axis is determined, corrections for aberrations such as distortion can be applied.

20 Claims, 8 Drawing Sheets

OPTICAL CENTER DETECTION IN PLENOPTIC IMAGING SYSTEMS

BACKGROUND

1. Technical Field

This disclosure relates generally to the calibration and/or characterization of plenoptic imaging systems.

2. Description of the Related Art

The plenoptic imaging system has recently received increased attention. It can be used to recalculate a different focus point or point of view of an object, based on digital processing of the captured plenoptic image. The plenoptic imaging system also finds application in estimating depth to three-dimensional objects that are imaged by the plenoptic imaging system, possibly followed by three-dimensional reconstruction of those objects or the entire three-dimensional scene.

However, the architecture of a plenoptic imaging system is dissimilar from a conventional imaging system and requires different calibration and processing procedures. Many plenoptic imaging systems use a complex set of optics including imaging optics and an array of microlenses. In many plenoptic imaging systems, the optical axis of the primary imaging optics may not be perfectly aligned with the microlens array or the sensor array. In addition, optical aberrations that are centered on the optical axis may cause shifts in disparity or other effects in the plenoptic image.

SUMMARY

In one aspect, a plenoptic imaging system includes imaging optics, a microlens array and a sensor array. The imaging optics is characterized by an optical axis. A method for estimating a location of the optical axis on the sensor array includes the following. A plenoptic image of a predetermined object captured by the plenoptic imaging system is filtered. The plenoptic image has a plurality of superpixels, with each superpixel comprising a plurality of subpixels. The filtering reduces high frequency components resulting from boundaries between the superpixels. The optical axis location is determined based on the filtered plenoptic image.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

Figure 1:
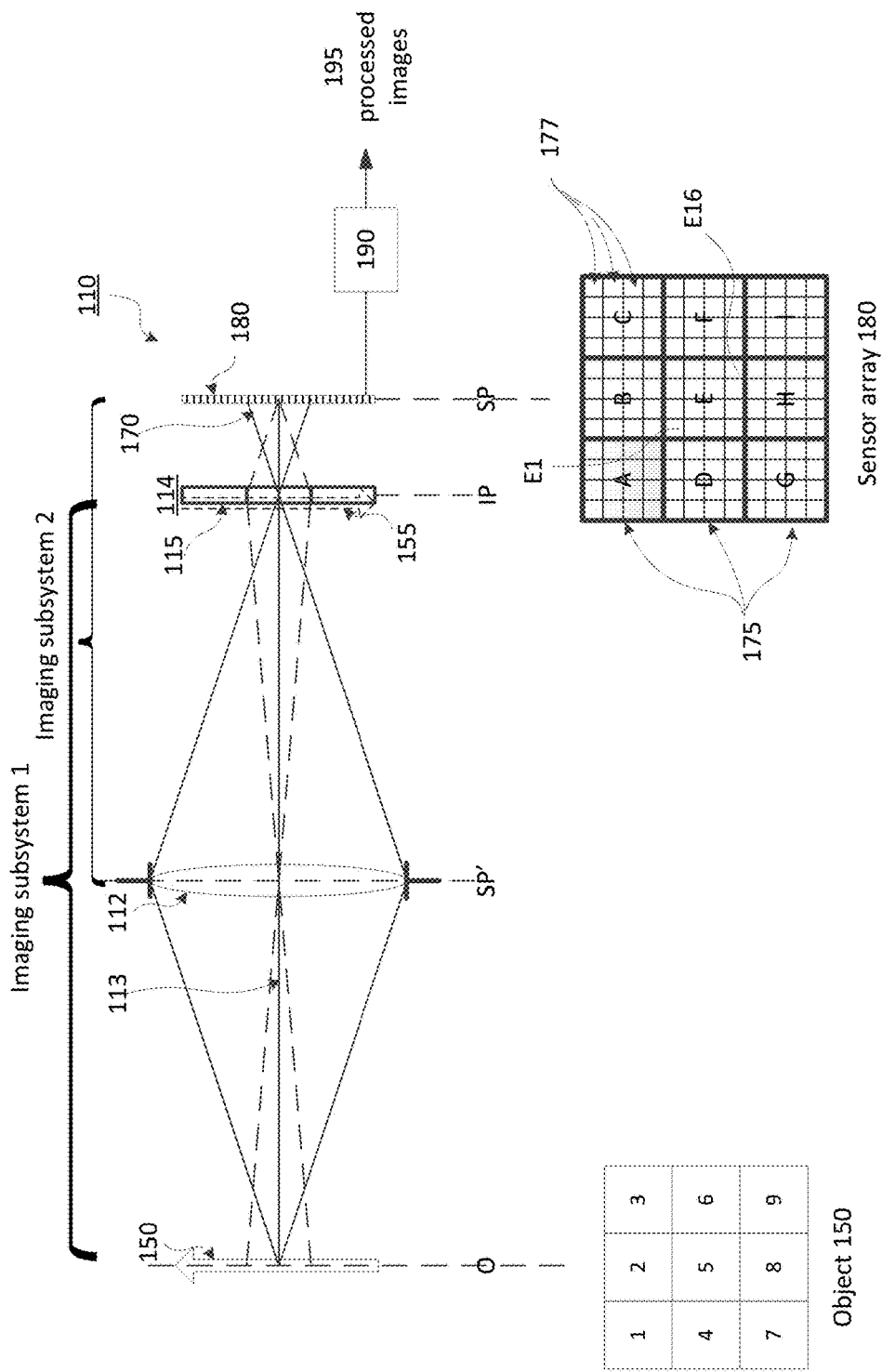
FIG. 1 is a diagram of a plenoptic imaging system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

In one aspect, the present disclosure overcomes the limitations of the prior art by providing a procedure to estimate the location of the optical axis for a plenoptic imaging system, based on filtering the captured plenoptic image to reduce high frequency components. This can be used to improve correction for the effects of optical aberrations.

One approach determines the location of the optical axis by first filtering a captured plenoptic image, as follows. For example, the captured plenoptic image is noise filtered, by setting to zero those pixels in the plenoptic image that are below a threshold. The noise filtered image is downsampled. A low pass filter is applied, further reducing the high frequency components of the plenoptic image. The image is noise filtered again, setting to zero those filtered pixels that are below a threshold.

The filtered plenoptic image is processed to determine the optical axis location along a search direction (e.g., along the y-axis), for example as follows. A first search band spanning a range of different values along the search direction (e.g., range $\Delta y$) is established. In one approach, the first search band may span the entire plenoptic image. Multiple slices of the plenoptic image are taken at different values of the search coordinate (i.e., different y values). Each slice is, generally, a group of rows (or columns) of pixels of the filtered plenoptic image. Because the processed plenoptic image has an energetic center at the location of the optical axis, each slice will have a total power that varies with location in the search band. The slice with maximum power is selected. If the slice includes more than one row (or column) of pixels, the process is repeated. The new search band is the rows (or columns) of the slice with the maximum power. Multiple slices within the search band are again taken at different values of the search coordinate and the slice with maximum power is selected. This is repeated until a single row (or column) of sensors is selected, which determines the location of the optical axis in the search direction (i.e., y coordinate of the optical axis). A similar approach can be performed in the orthogonal direction (x direction) to obtain the two-dimensional coordinates of the optical axis. These coordinates can be mapped back to the actual sensor coordinates by applying the inverse to the filtering and subsampling processes.

In another aspect, optical aberration in the primary optics (such as distortion) causes a shift in disparity in the captured plenoptic image. These optical aberrations are located relative to the optical axis. Knowing the location of the optical axis, the system can determine and apply a correction factor to the plenoptic image.

In more detail, FIG. 1 is a diagram illustrating a plenoptic imaging system. The plenoptic imaging system 110 includes imaging optics 112 (represented by a single lens in FIG. 1) with optical axis 113, a microlens array 114 (an array of microlenses 115) and a sensor array 180. The microlens array 114 and sensor array 180 together may be referred to as a plenoptic sensor module. These components form two overlapping imaging subsystems, shown as subsystem 1 and subsystem 2 in FIG. 1.

For convenience, the imaging optics 112 is depicted in FIG. 1 as a single objective lens, but it should be understood that it could contain multiple elements. The objective lens 112 forms an optical image 155 of the object 150 at an image plane IP. The microlens array 114 is located at the image plane IP, and each microlens images the aperture of imaging subsystem 1 onto the sensor array 180. That is, the sensor array and aperture are located at conjugate planes SP and SP'. The microlens array 114 can be a rectangular array, hexagonal array or other types of arrays. The sensor array 180 is also shown in FIG. 1.

The bottom portion of FIG. 1 provides more detail. In this example, the microlens array 114 is a 3×3 array of microlenses 115. The object 150 is divided into a corresponding 3×3 array of regions, which are labeled 1-9. Each of the regions 1-9 is imaged by the imaging optics 112 and imaging subsystem 1 onto one of the microlenses 115. The dashed rays in FIG. 1 show imaging of region 5 onto the corresponding center microlens.

Each microlens 115 images these rays onto a corresponding section of the sensor array 180. The sensor array 180 is shown as a 12×12 rectangular array. The sensor array 180, and plenoptic image, can be subdivided into superpixels 175, labelled A-I, with each superpixel corresponding to one of the microlenses and therefore also corresponding to a certain region of the object 150. In FIG. 1, superpixel E corresponds to the center microlens, which corresponds to region 5 of the object. That is, the sensors within superpixel E capture light from region 5 of the object.

Each superpixel contains many individual subpixels. In this example, each superpixel 175 has a 4×4 array of individual subpixels 177. Generally, each subpixel is generated by a sensor of the sensor array. Each subpixel within a superpixel captures light from the same region of the object, but at different propagation angles. For example, the upper left subpixel E1 in superpixel E captures light from region 5, as does the lower right subpixel E16 in superpixel E. However, the two subpixels capture light propagating in different directions from the object. This can be seen from the solid rays in FIG. 1. All three solid rays originate from the same object point but are captured by different subpixels within the same superpixel. That is because each solid ray propagates along a different direction from the object. In this example, the plenoptic image 170 includes nine superpixels A-E, each of which contains 16 subpixels. That is a total of 16×9=144 pixels in the plenoptic image.

In other words, the object 150 generates a four-dimensional light field $L(x,y,u,v)$, where L is the amplitude, intensity or other measure of a ray originating from spatial location $(x,y)$ propagating in direction $(u,v)$. Each subpixel 177 in the sensor array captures light from a certain volume of the four-dimensional light field. The sensor of each subpixel is sampling the four-dimensional light field. The shape or boundary of such volume is determined by the characteristics of the plenoptic imaging system.

In certain plenoptic imaging system designs, the sample volumes are hyperrectangles. That is, every sensor within a superpixel captures light from the same rectangular (x, y) region associated with the superpixel 175, and each subpixel 177 within the superpixel captures light from a different rectangular (u, v) region. However, this is not always the case. For convenience, the superpixels will be described as capturing light from a certain region of the object 150 (even though sensors within that superpixel may capture light from slightly different regions), and the subpixels will be described as capturing light from a certain range of propagation directions (even though the range may be different for different subpixels, or even for different (x, y) points captured by the same subpixel). Regardless of the details, the plenoptic imaging system creates a plenoptic image 170, which maps (x, y) spatial locations and (u, v) propagation directions to subpixels in the sensor array 180. This is in contrast to a conventional image, which maps (x, y) spatial locations to subpixels but loses information about the (u, v) propagation directions.

The plenoptic image 170 contains information about the four-dimensional light field produced by the object. Therefore, the processing module 190 can be used to perform different types of analysis, such as depth estimation, three-dimensional reconstruction, synthetic refocusing, extending the depth of focus, spectral analysis and other types of multi-view analysis.

However, many of these analyses depend on the mapping from the light field coordinates (x, y, u, v) to the individual subpixels. That is, each individual sensor captures a certain volume of the four-dimensional light field. Having an accurate knowledge of which subpixel captures which volume is important for good processing of the captured plenoptic image. For convenience, the (x, y) region that maps to a subpixel will be referred to as the light field viewing region for that subpixel, and the (u, v) region that maps to a sensor will be referred to as the light field viewing direction for that subpixel.

The superpixel is the aggregate of all subpixels that have the same light field viewing region. The view is an analogous concept for propagation direction. The view is the aggregate of all subpixels that have the same light field viewing direction. In the example of FIG. 1, the individual subpixels A1, B1, C1, . . . I1 make up the upper left view of the object. The individual subpixels A16, B16, C16, . . . I16 make up the lower right view of the object. The center view is the view that corresponds to (u, v)=(0, 0), assuming that the plenoptic imaging system is an on-axis symmetric system. Each view is an image of the object taken from a particular viewpoint.

FIG. 1 is an ideal situation, in which each superpixel contains exactly 16 sensors and the views of each superpixel is easily determined. In real systems, this typically is not the case. The shape of the imaging optics 112 and microlens array 114, manufacturing and assembly tolerances, misalignment of the microlens array 114 relative to the sensor array 180, vignetting, and aberrations may all cause degradation from the ideal situation. As a result, the actual superpixels and their views may be misaligned or otherwise distorted with respect to the underlying sensor array. Assuming an ideal situation when that is not the case will lead to errors in later analyses.

For example, optical aberrations such as distortion in the primary imaging optics 112 can lead to these types of effects. Because the plenoptic image 170 images the object with both the imaging optics 112 and the microlens array 114, the processing module 190 can be used to perform different types of analysis of the plenoptic image, including analysis to determine the location of the optical axis 113 of the main lens 112 projected onto the plenoptic image. This can then be used to correct for effects caused by optical aberrations in the main lens 112.

Figure 2:
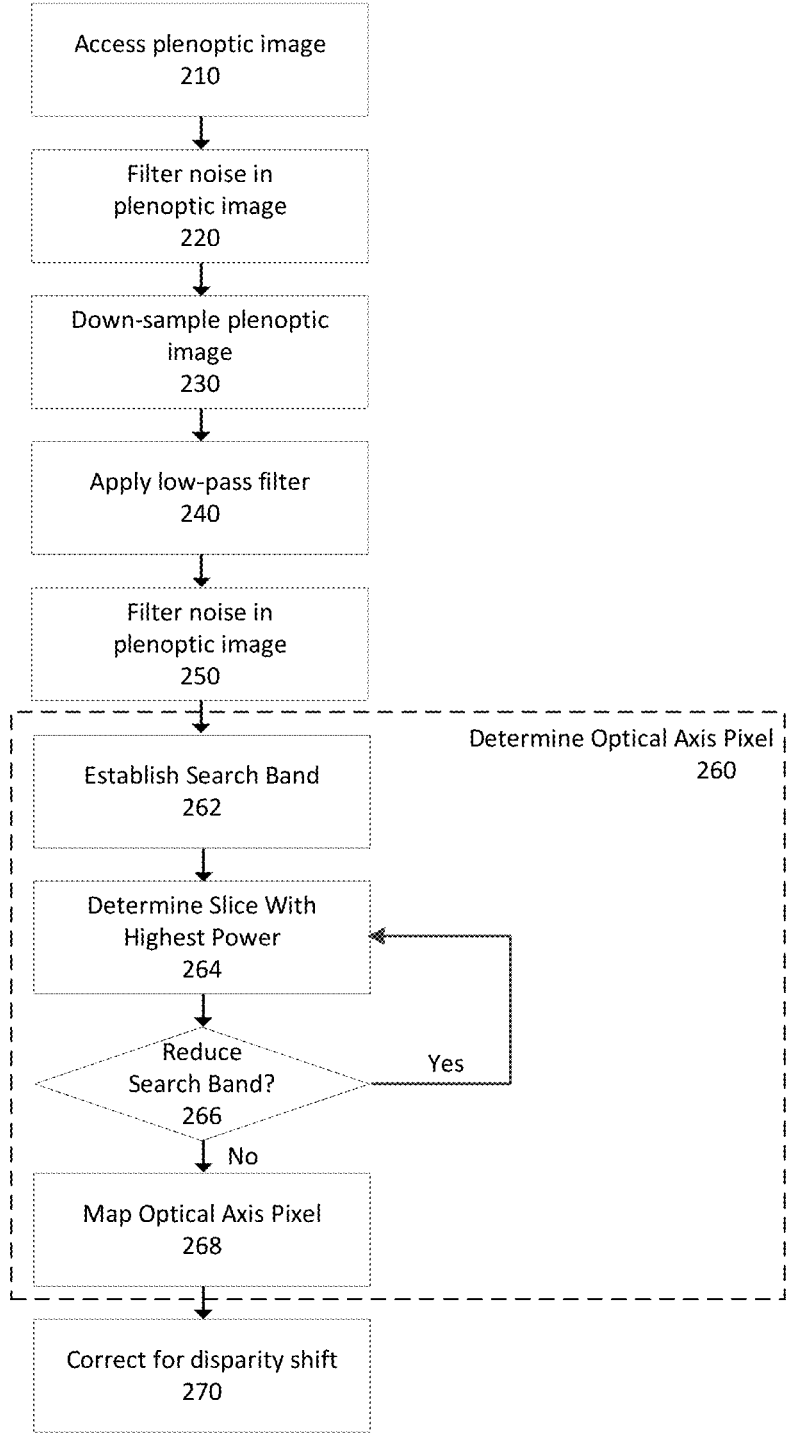
FIG. 2 is a flow diagram of one method for estimating the optical axis of the plenoptic imaging system, according to one example embodiment.

FIG. 2 is a flow diagram for determining the optical axis of a plenoptic imaging system from captured plenoptic images, according to one example embodiment. In this example, the optical axis of the primary imaging optics is located at a pixel of the plenoptic image, that will be referred to as the optical axis pixel. For clarity, the optical axis pixel may or may not be the pixel located at the geometric center of the sensor array. This pixel will be called the central pixel.

The process of identifying the optical axis is explained with reference to FIGS. 2-8. In the examples described below, the process of FIG. 2 is performed by the plenoptic imaging system 110 (e.g. via the processing module 190). In another embodiment, the process is performed by a computing system separate from the plenoptic imaging system. Other modules may perform some or all of the steps of the process in other embodiments. Likewise, embodiments may include different and/or additional steps or perform the steps in differing order.

In the process of FIG. 2, the processing module 190 accesses 210 a plenoptic image of a calibration object captured by the plenoptic imaging system 110. Here, the calibration object is a uniformly illuminated white card, but other examples include objects without high frequency characteristics when uniformly illuminated. The plenoptic image includes an array of superpixels, with each superpixel containing a number of subpixels as previously described.

Figure 3A:
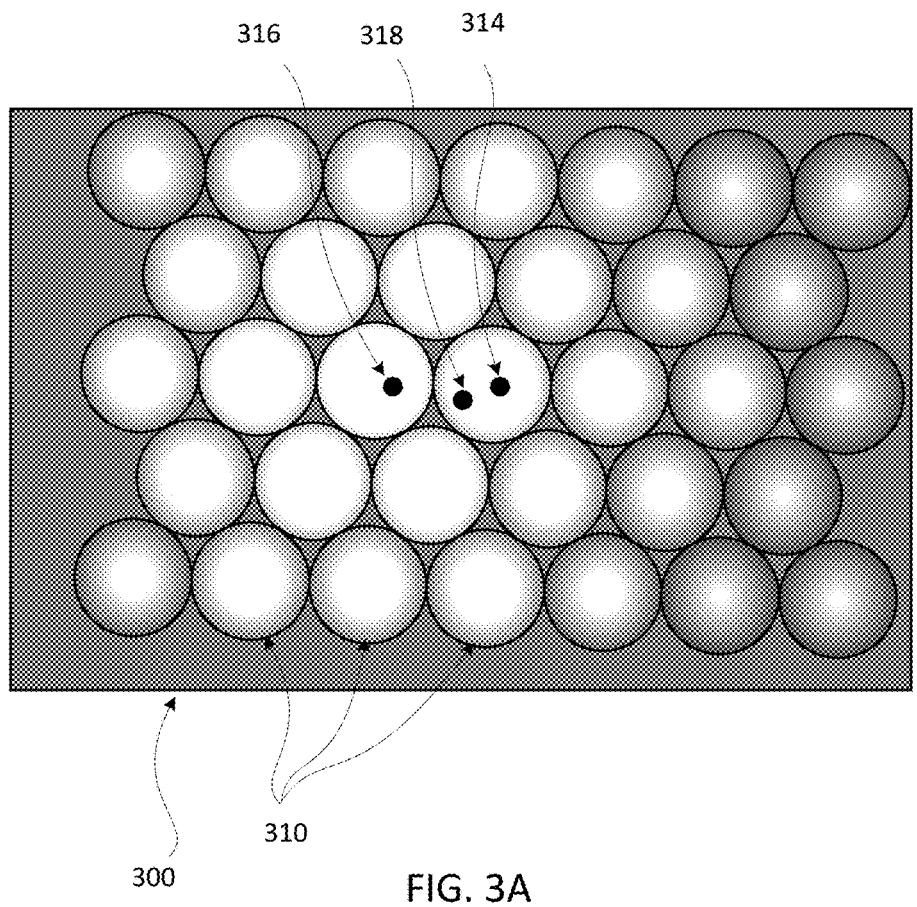
FIG. 3A illustrates a plenoptic image, according to one example embodiment.

FIG. 3A is an illustration of a plenoptic image 300 accessed 210 by the system, according to one example embodiment. In the illustrated embodiment, the plenoptic image captures an image of a calibration object (e.g. a white card) as an array of pixels. In the illustrated example, the individual pixels are not shown because they are too small. The plenoptic image 300 includes an array of hexagonally packed superpixels 310. However, the superpixels can be arranged in any other array pattern (e.g., a square array).

Further, in FIG. 3A, the superpixels 310 are largely round (as opposed to the square superpixels shown in FIG. 1) because the pupil for the imaging optics 112 is round. Each superpixel 310 contains subpixels. The collection of all subpixels for all superpixels are the pixels of the plenoptic image as a whole. Each of the 310 experiences some degree of vignetting and the degree of vignetting can be different for each of the superpixels 310. In the illustrated embodiment, the central microlens pixel 314 (which is the pixel that corresponds to the center view of the center superpixel), the optical axis pixel 316, and the central pixel 318 are all located at different pixels in the plenoptic image. However, in other embodiments, any of the central microlens pixel 314, the optical axis pixel 316, and the central pixel 318 can be similarly located at any pixel.

Figure 3B:
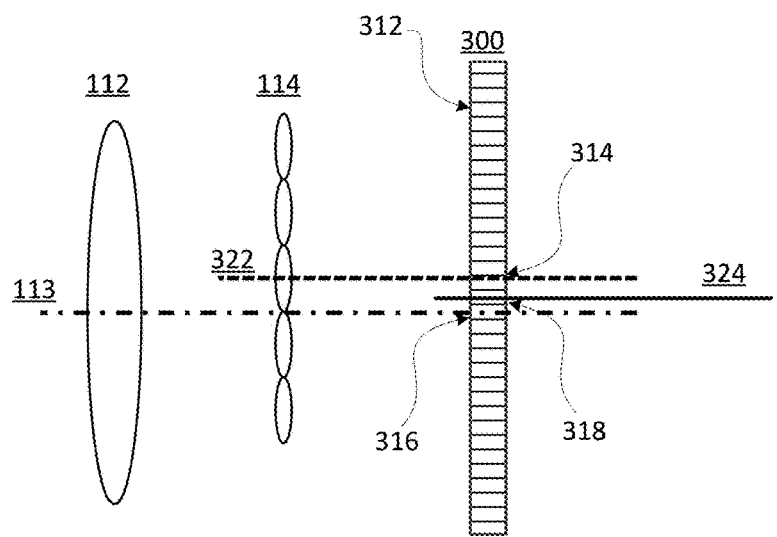
FIG. 3B illustrates various points on a plenoptic image, according to one example embodiment.

FIG. 3B illustrates a representation of these different pixels in the plenoptic imaging system, according to one example embodiment. The image illustrates the optical axis 113 of the imaging optics 112, the optical axis 322 of the central microlens of the microlens array 114 (which in this example is assumed to correspond to the center view), and the geometric center 324 of the sensor array. The central microlens pixel 314 is the projection of the optical axis 322 of the central microlens of the microlens array 114 onto the plenoptic image 300. The central pixel 318 is the pixel at the geometric center of the sensor array. The optical axis pixel 316 is the projection of the optical axis 113 of the imaging optics 112 onto the plenoptic image 300. In the illustrated example, misalignment and aberrations of the imaging optics 112, the microlens array, and the sensor array cause the optical axis pixel 316, the central microlens pixel 314, and the central pixel 318 to be at different locations.

Returning to FIG. 2, the system filters 220 noise from the plenoptic image. In one particular embodiment, the system uses threshold suppression to filter noise from the plenoptic image. That is, the accessed plenoptic image is filtered by suppressing (i.e., setting to zero) those pixels which have values below a threshold. In many cases, the suppressed pixels are ones that experience significant vignetting.

For example, assume the plenoptic imaging system is configured such that the pixel values of the plenoptic image are between 0 and 1. The pixel value at the (5, 5) viewpoint of a superpixel in the first viewing region of the plenoptic image is L(1, 1, 5, 5)=0.15. The threshold used for this stage of noise reduction is 0.42. Because the pixel value is below the threshold value, the processing module sets L(1, 1, 5, 5)=0. In other embodiments, the processing module may suppress a pixel by setting the pixel values to other non-zero values.

In some embodiments, the threshold value can be dynamically determined. In one example, the system can determine the pixel values of all the pixels of a plenoptic image and group the determined values into a histogram of pixel values, i.e. for each pixel value in a plenoptic image, the system determines the number of pixels with that pixel value. In some embodiments, the system can group pixel values into a range of pixel values (i.e., a bin) and determine the number of pixels in that range. Based on the histogram of pixel values, the system can select a threshold value. The system can select a threshold value based on any number of selection criteria. The selection criteria can include: suppressing a percentage of pixels, suppressing a number of the ranges, suppressing a specific number of pixels, suppressing specific pixel values, threshold values received from a user of the plenoptic imaging system, threshold values stored in the memory of the plenoptic imaging system, etc.

For example, assume a plenoptic image is 1000×1000 pixels with each pixel having a value between 0 and 1. The system creates ten bins of pixel values from 0.00-0.09, 0.10-0.19, 0.20-0.29, etc. The system analyzes the pixel values for each pixel and determines that there are 1100 pixels in the first bin, 1400 pixels in the second bin, 500 pixels in the third bin, etc. The selection criteria for the threshold value indicates that the bottom 30% of the pixels will be suppressed. Thus, the system selects a threshold value of 0.29 and suppresses the pixel values of all of the pixels in the first three bins of the histogram by setting their pixel values to 0.00.

Any number of other noise filtering techniques can also be employed including: chroma noise filtering, linear (or bilinear, etc.) smoothing, non-linear smoothing, anisotropic diffusion, nearest neighbor averaging, statistical methods, wave transforms, or any other noise filtering process applicable to plenoptic images.

Returning to FIG. 2, the processing module downsamples 230 the noise-filtered plenoptic image. Subsampling the plenoptic image is a form of low pass filtering and reduces the higher frequency components of the plenoptic image. While subsampling reduces the number of pixels in the plenoptic image, the remaining pixels in the plenoptic image are still representative of the captured light field data.

In one example embodiment, the processing module down-samples 230 the plenoptic image by removing rows and (or) columns of pixels from the plenoptic image. For example, a plenoptic image has 1000 rows and 1000 columns of pixels with each pixel having a pixel value, i.e. $I = \Sigma_{i,j}^{1000} L(i,j)$ where I is the plenoptic image and L(i,j) are the pixel values for row i and column j. The system down-samples 230 the plenoptic image by removing every other row and column of the plenoptic image, i.e. $I_{Subsampled} = \Sigma_{i,j}^{500} L(2i;2j)$. In other embodiments, the system can down-sample the plenoptic image by other factors (e.g., one out of four rows, one out of eight rows, etc.) and in any direction along the plenoptic image (e.g., the x-direction, the y-direction, along a vector, etc.). The subsampling can be based on combining pixels, rather than just decimating the pixels.

Returning to FIG. 2, the system applies 240 a low pass filter to the down-sampled plenoptic image to further remove high frequency components from the plenoptic image. Generally, the high frequency components in the plenoptic image are caused by boundaries between the superpixels. The low-pass filter reduces these components.

In one example embodiment, the low-pass filter can be the convolution of the plenoptic image with a Gaussian kernel of first order. The Gaussian kernel for two dimensions can be written as:

$$G(x, y) = \frac{1}{2\pi\sigma^2} e^{-\frac{x^2+y^2}{2\sigma^2}} \quad (1)$$

where σ is the standard deviation of the distribution. In some embodiments, σ is a function of the microlens diameter. For example, in a plenoptic imaging system with a 50 μm microlens diameter the system selects σ as 100. Generally, σ is large enough to negate the effects of superpixel boundaries within the plenoptic image.

The Gaussian kernel applied to the plenoptic image acts to smooth the plenoptic image as a "point-spread" function by convolving a discretized version of the Gaussian kernel and the plenoptic image. This convolution can be represented as:

$$I_{smoothed}(x, y) = \sum_{-dx}^{dx} \frac{\sum_{-dy}^{dy} I_{subsample}(x+dx, y+dy)}{G(dx, dy)} \quad (2)$$

where x and y are the pixel coordinates, dx and dy are the discretization kernel parameters, and G(dx, dy) is the weight of the Gaussian at (dx, dy). In effect, applying the low pass filter blurs the plenoptic image.

While only a first-order Gaussian kernel low pass filter is described, the system can apply any number of low pass filters to the plenoptic image, such as: a mean filter, nearest neighbor averaging, and weighted averaging.

Returning to FIG. 2, the system filters 250 the noise of the low-pass filtered plenoptic image. Similarly to the previous filter 220, the secondary noise filter 250 can suppress pixel values that are below a threshold value. The threshold value of the secondary noise filter can be different from the initial threshold value. Additionally, the threshold value can be dynamically determined from a second histogram of the pixel values of the plenoptic image using methods previously described. The secondary noise filter can also be any other type of noise filter.

Figure 4:
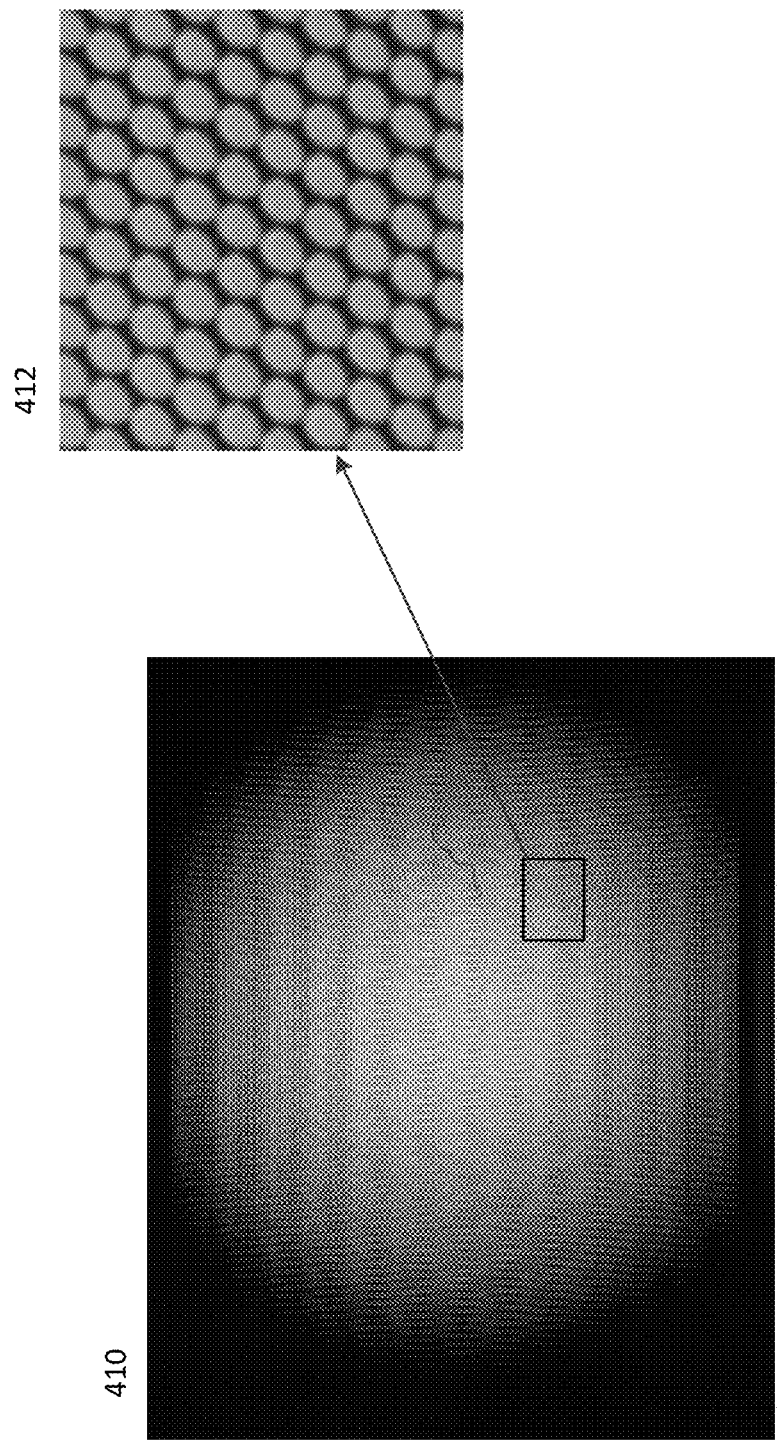
FIGS. 4 and 5 illustrate a plenoptic image before and after low pass filtering, according to one example embodiment.
Figure 5:
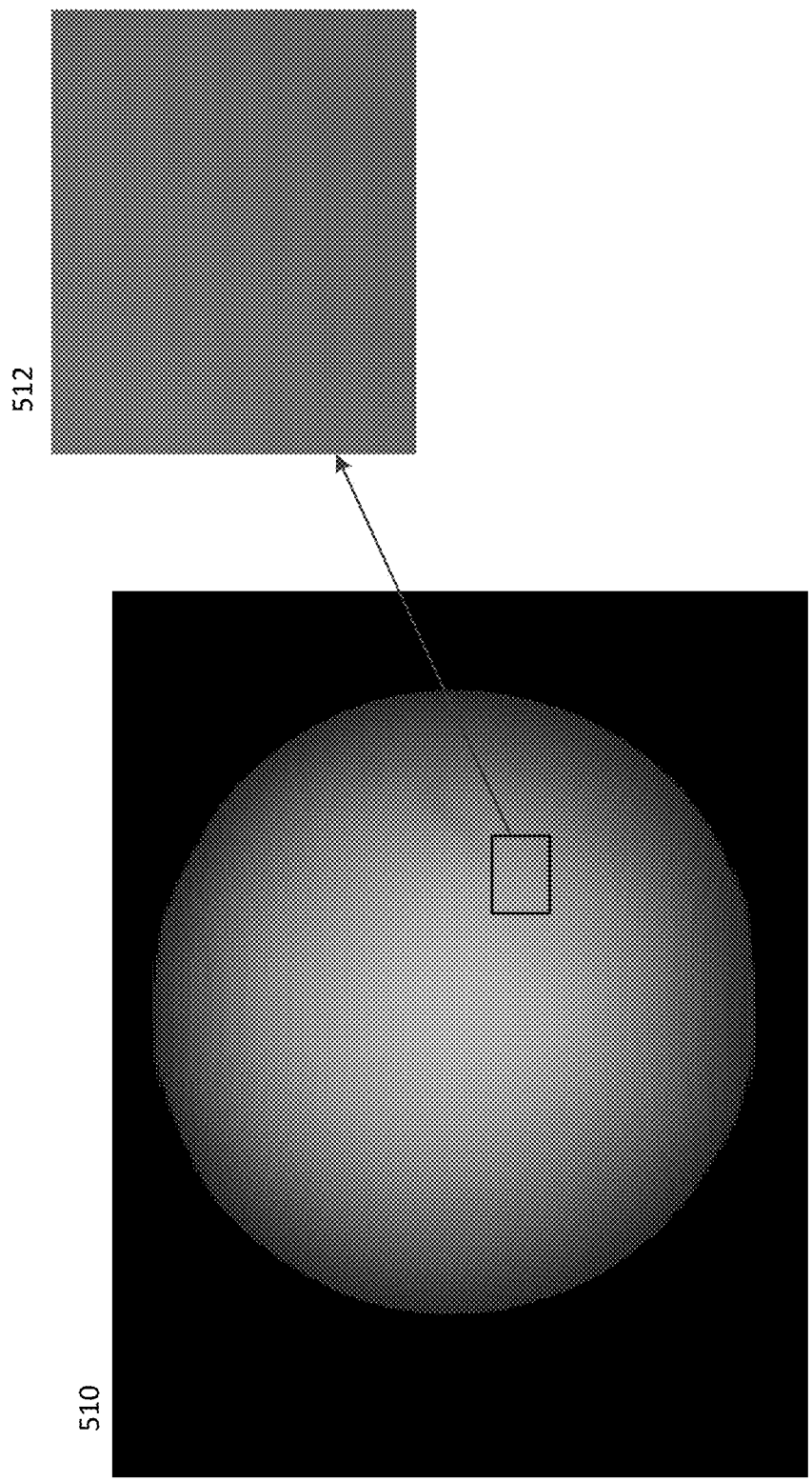

Steps 210-250 are used to reduce the high frequency components within a plenoptic image, which typically is a result of image structure caused by the superpixel boundaries. FIG. 4 shows a plenoptic image 410 of a white calibration object. The inset 412 is a zoomed-in view. The superpixel structure is visible. FIG. 5 shows the same plenoptic image but after it has been filtered 220, down-sampled 230, and low pass filtered 240. The inset 512 is a zoomed in view of a similar region of the plenoptic image 510. The high frequency structure has been smoothed out. The individual superpixel structure is no longer visible.

Based on the plenoptic image processed by steps 210-250, the system determines 260 the optical axis pixel of a plenoptic image. To determine 260 the optical axis pixel, the system establishes 262 a search band of candidate slices, determines 264 the slice with the highest power, and then iteratively reduces 266 the size of the search band until the optical axis pixel is determined. It then maps 268 the location of the optical axis pixel back to the coordinates of the original plenoptic image (i.e., before filtering steps 210-250).

Figure 6A:
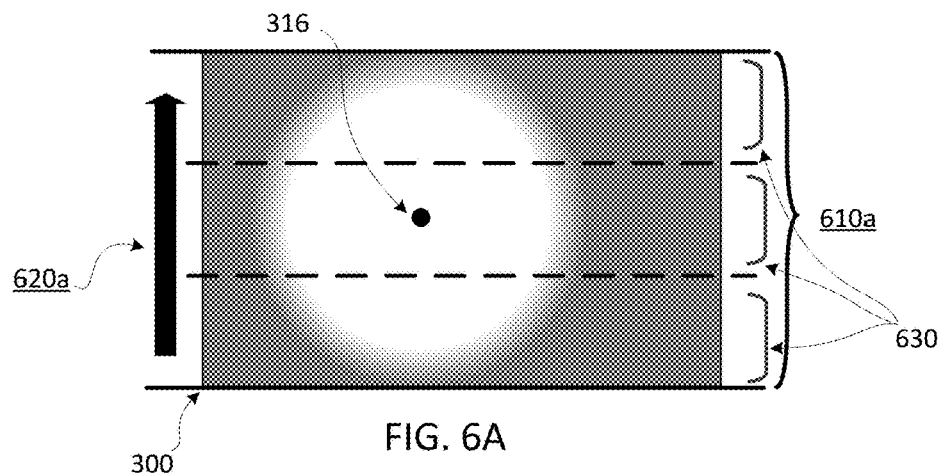
FIGS. 6A-6C illustrate search bands for different search directions, according to one example embodiment.
Figure 6B:
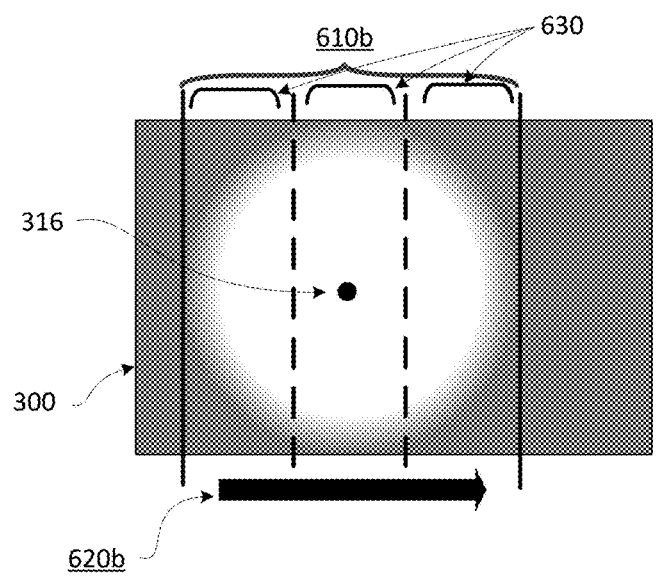
Figure 6C:
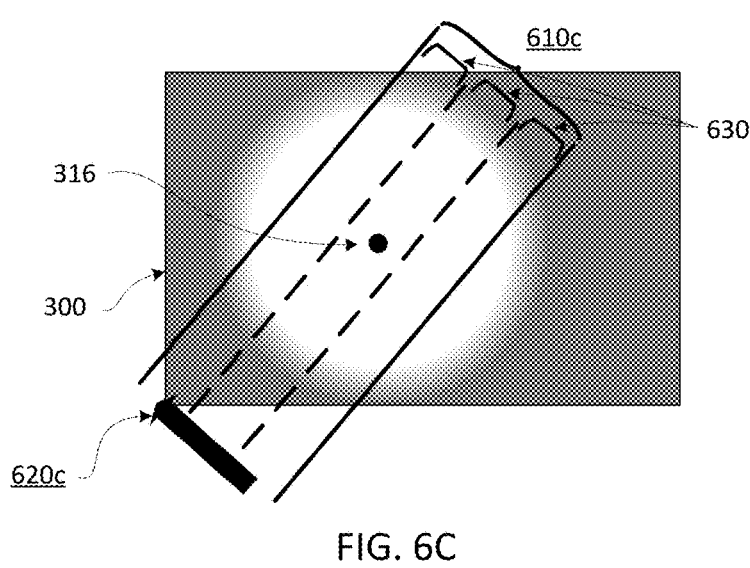

In more detail, an initial search band is established 262 for the plenoptic image. The search band spans a range of different values along a search direction. FIGS. 6A-6C illustrate search bands 610a-610c covering different regions of the plenoptic image 300, along different search directions, and having different candidate slices. The pixels of the plenoptic image are not shown for clarity. For convenience of illustration, the optical axis pixel 316 is located in center of the search bands 610a-610c. However, the optical axis pixel 316 may not be in the center of the search band 610 and can be located anywhere within the plenoptic image 300. The search direction in each FIG. 6A-6C is shown by the arrow 620a-c.

Generally, the system selects an initial search band 610 that includes the entire plenoptic image 300 (for example, as in FIGS. 6A and 6B), but it can be any region of the plenoptic image (for example, as in FIG. 6C). Additionally, the search direction 620 is preferably orthogonal to the pixel rows or pixel columns of the plenoptic image. For example, if the search direction 620b is orthogonal to the columns of pixels in the plenoptic image, as in FIG. 6B, and the plenoptic image is 450×800 pixels, the search band 610b can cover all 800 columns. Similarly, if the search direction 620a is orthogonal to the rows of pixels in the plenoptic image, as in FIG. 6A, the search band 610a can cover all 450 rows. While the search direction is preferably orthogonal to the rows or columns of the plenoptic image, search bands in any number of search directions can be used, for example see FIG. 6C. The search band preferably is wide enough that it will contain the optical axis pixel 316.

The system considers different candidate slices through the search band and determines 264 which candidate slice has the highest power. This slice will be referred to as the maximum power slice. The candidate slices 630 divide the search band 610 along the search direction 620 and extend in a direction orthogonal to the search direction. The candidate slices 630 are groups of pixels orthogonal to the search direction in FIGS. 6A-6C. Generally, each candidate slice includes several rows (or columns) of pixels within the search band of rows (or columns). In some embodiments, candidate slices can include a fractional row (or column) of pixels, for example if the plenoptic image has been down-sampled and each row in the down-sampled image corresponds to multiple rows in the original plenoptic image. The pixel values of each candidate slice are analyzed and the maximum power slice is selected based on this analysis. In one embodiment, the selection can be made by comparing the total signal power of all the pixel values in each candidate slice. For example, the signal power of a candidate slice, can be represented as $$S_{CS} = \int_{y=0}^{h} \int_{x=0}^{w} I(x,y)_{CS} dx\, dy \quad (3)$$

where dx is the horizontal pixels, dy is the vertical pixels, I is the pixel value, w is the horizontal width of the slice, h is the vertical height of the search band, and the subscript CS indicates the pixel values of the candidate slice of interest. Generally, $S_{CS}$ can be interpreted as the total signal power of the pixel values in the candidate slice of interest. The system compares the total signal power of each candidate slice and selects the maximum power slice as the candidate slice with the highest determined total signal power. Note that maximum power can be determined in either the space domain or the spatial frequency domain. It can be based on the pixel values themselves, or on the magnitudes of the spatial frequency components.

After the maximum power slice is determined 264, the system can choose to reduce 266 the search band. Reducing the search band will create a new, narrower search band of rows (or columns) using the rows (or columns) of the maximum power slice. The system will again consider different candidate slices through this new search band and consider which candidate slice has the highest power, i.e. determine a maximum power slice within the new search band. Generally, the process of reducing 266 the search band and selecting a maximum power slice 264 is repeated until the maximum power slice is reduced to a single row (or column) of pixels. This row (or column) of pixels will be called the optical axis slice.

Figure 7A:
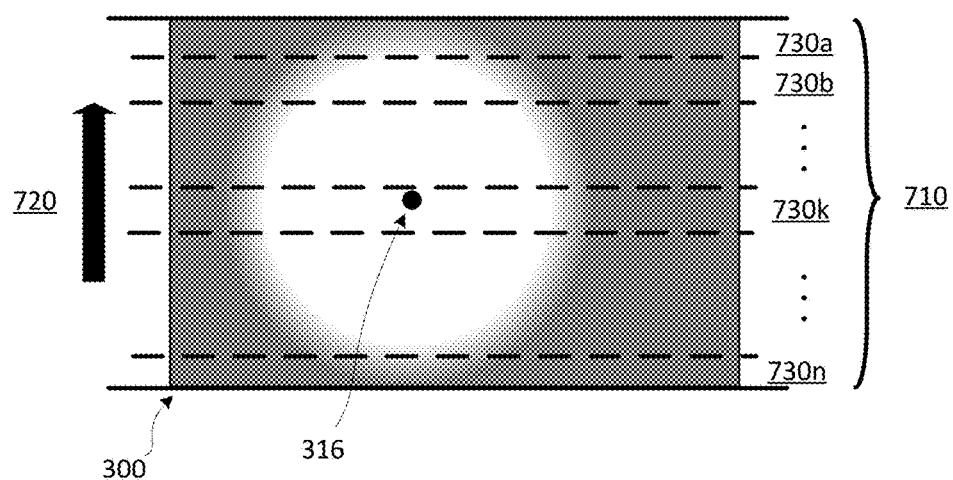
FIGS. 7A-7B illustrate iterative searching to locate the optical axis, according to one example embodiment.
Figure 7B:
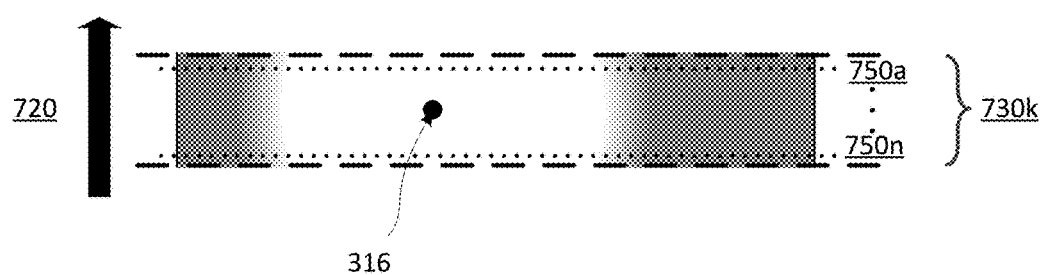

Consider the above example using a 450×800 pixel plenoptic image. Referring to FIG. 7A, the system establishes 262 an initial search band 710 which includes the entire 450 pixel rows of the plenoptic image. The system divides the search band 710 into thirty candidate slices 730a-n of 15 pixel rows each. The system analyzes the pixel values for these candidate slices 730 and determines 264 the maximum power slice 730k is the candidate slice that includes the middle 15 pixel rows. The system then reduces 266 the search band. As shown in FIG. 7B, the new search band 730k is the middle 15 pixel rows of the plenoptic image. The system divides this search band 730k into 15 candidate slices 750a-n of 1 pixel row each. The system analyzes the pixel values for the 15 slices and determines 264 the maximum power slice is the 6$^{th}$ row in the search band 730k. As the maximum power slice is a single row of pixels, the system selects this row as the optical axis slice.

A similar process as described above is conducted for a second search band in an orthogonal search direction. The optical axis slice for the first search band yields the y-value of the optical axis point. The optical axis slice for the second search band yields the x-value of the optical axis point. Together, these yield the (x, y) coordinates of the location of the optical axis 113. The optical axis pixel 316 is the pixel at this (x, y) location. The intersection between the optical axis slices for the different search directions determine the optical axis point and/or optical axis pixel of the plenoptic image.

Returning to FIG. 2, the system maps 268 the optical axis pixel from the processed plenoptic image back to the coordinate system of the original plenoptic image. For example, if the optical axis pixel is determined in the down-sampled coordinate system, an inverse mapping can be used to transform the coordinates of the optical axis pixel back to the coordinates of the original plenoptic image before down-sampling. The location of the optical axis can also be determined to sub-pixel resolution if needed.

Figure 8B:
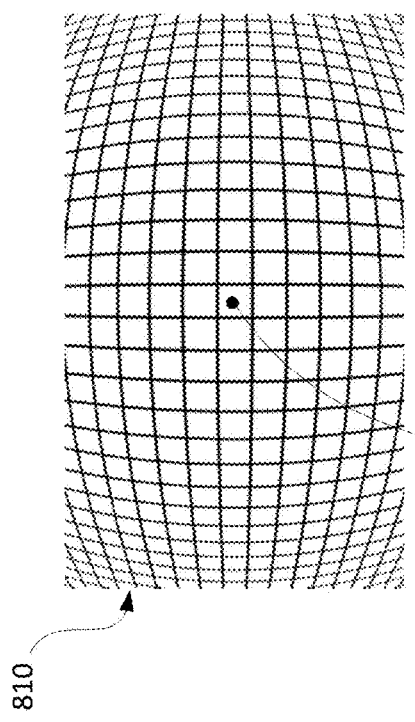
FIGS. 8A-8D illustrate the shift in disparity caused by distortion, according to one example embodiment.
Figure 8A:
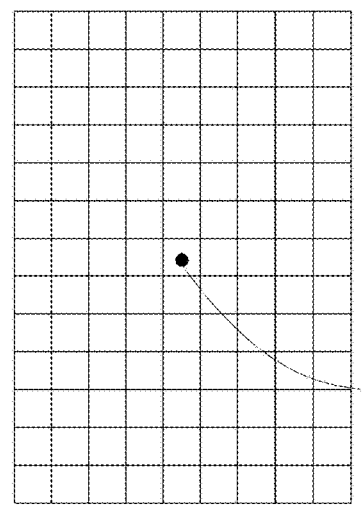

Once the location of the optical axis is known, effects that are defined relative to the optical axis can be corrected 270. One example is distortion. The primary imaging optics 112 may suffer from distortion (e.g. barrel distortion). Broadly speaking, image distortion is a deviation from a rectilinear projection of the object 150 onto its aerial image (155 in FIG. 1). That is, if the object 150 is a grid of straight lines, the primary optics 112 without distortion will reproduce a grid of straight lines, as shown in FIG. 8A. However, primary optics 112 with barrel distortion will produce an aerial image 155 with distorted (e.g., curved or wavy) lines in place of the straight lines, for example as shown in FIG. 8B. The distorted grid 810 appears wrapped around a "barrel" with the lines proximal to the optical axis straighter than the lines nearer the edges of the image. Other types of image distortion include fish-eye, pincushion, mustache distortions, tangential distortions, and decentered distortions.

Image distortions in the primary optics 112 affect depth estimation in a plenoptic system. Using the example of the barrel distortion in FIG. 8B, the image magnification decreases with distance from the optical axis. This distortion results in superpixels and subpixels away from the optical axis receiving the light that would nominally (i.e. in a system without distortion) be received by superpixels and subpixels nearer the optical axis. That is, the distortion shifts the locations of viewpoints in the plenoptic image. In plenoptic imaging systems, images from different viewpoints are used to calculate disparity, which in turn is used to estimate depth. A shift in the locations of the viewpoints due to distortion will cause a corresponding shift (error) in the calculated disparity and depth.

Figure 8D:
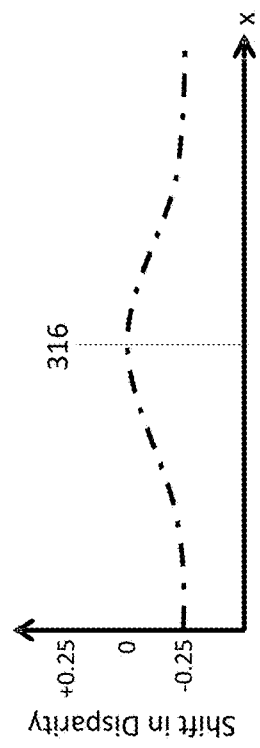
Figure 8C:
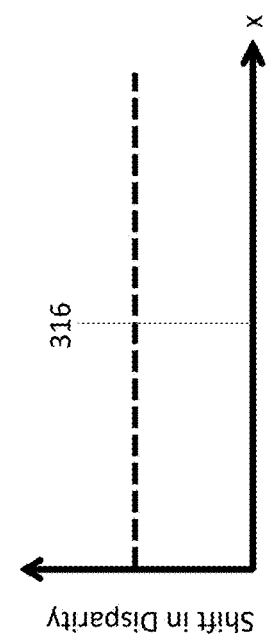

FIG. 8C is a plot of disparity shift as a function of coordinate x, for the plenoptic image without distortion of FIG. 8A. Because there is no distortion in this case, there also is no disparity shift. FIG. 8D plots the disparity shift for the system of FIG. 8B with barrel distortion. The shift in disparity is a non-linear function. In this particular example, the disparity of the plenoptic image increases with distance from the optical axis 316. A correction factor can be applied, since the location of the optical axis 316 has been determined.

In one approach, the corrected disparity is calculated as $$D_{corrected}(x,y) = D_{determined}(x,y) - D_{distortion}(x,y) \quad (4)$$

where $D_{corrected}$ is the corrected disparity, $D_{determined}$ is the disparity calculated assuming no distortion in the primary optics, and $D_{distortion}$ is the shift in disparity caused by the distortion.

In one embodiment, the system stores the correction factors for each pixel location in a system memory. The plenoptic imaging system can access a plenoptic image of an object of interest (e.g. a human eardrum). The system can process the plenoptic image by applying the stored correction factors to the accessed plenoptic image and correct for optical aberrations.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. For a plenoptic imaging system comprising imaging optics, a microlens array and a sensor array, the imaging optics characterized by an optical axis, a method for estimating a location of the optical axis on the sensor array, the method comprising:
    filtering a plenoptic image of a predetermined object captured by the plenoptic imaging system, the plenoptic image comprising a plurality of superpixels with each superpixel comprising a plurality of subpixels, the filtering reducing high frequency components resulting from boundaries between superpixels;
    determining the location of the optical axis based on the filtered plenoptic image;
    accessing a second plenoptic image of an object of interest; and
    processing the second plenoptic image, the processing including applying a correction factor centered on the determined location of the optical axis.

2. The method of claim 1, wherein the correction factor corrects for distortion caused by the imaging optics.

3. The method of claim 2, wherein the distortion is one of barrel distortion, fish eye distortion, pincushion distortion, and moustache distortion.

4. The method of claim 2, wherein processing the second plenoptic image comprises calculating a disparity of the plenoptic image based on different views captured by different subpixels in the superpixels, the distortion shifts viewpoints of the different subpixels, and the correction factor corrects for the shift.

5. The method of claim 2, wherein correcting distortion caused by the plenoptic imaging optics modifies the pixel values in the plenoptic imaging system.

6. The method of claim 1, wherein filtering the plenoptic image uses a Gaussian kernel.

7. The method of claim 1, wherein determining the location of the optical axis based on the filtered plenoptic image comprises:
    for a search direction, determining a search band along the search direction, the search band spanning a range of different values for the search direction;
    taking a plurality of slices of the filtered plenoptic image along a slice direction that is orthogonal to the search direction, each slice having a different value of the search direction within the search band; and
    selecting a slice with a maximum total power from among the plurality of slices, the selected slice used to estimate location of the optical axis along the search direction.

8. The method of claim 7, wherein each slice is a row of sensors in the plenoptic image, taking the plurality of slices comprises taking a plurality of rows offset by different amounts along the search direction, and selecting the slice comprises selecting a row from the plurality of rows.

9. The method of claim 7, wherein each slice is less than a single row in the plenoptic image.

10. The method of claim 7, further comprising:
    taking a plurality of second slices along the slice direction from within the selected slice, each second slice having a different value of the search direction within the selected slice; and
    selecting a second slice with a maximum total power from among the plurality of second slices, the selected second slice used to estimate the location of the optical axis along the search direction.

11. The method of claim 10 wherein the selected slice comprises at least least two rows of sensors in the plenoptic image, each second slice is a row of sensors in the selected slice and the plurality of second slices comprise all of the rows of sensors in the selected slice, and selecting a second slice comprises selecting a row from the rows of sensors in the selected slice.

12. The method of claim 7, further comprising:
    for a second search direction, determining a second search band along the second search direction, the second search band spanning a range of different values for the second search direction;
    taking a plurality of second slices of the filtered plenoptic image along a second slice direction that is orthogonal to the second search direction, each second slice having a different value of the second search direction within the second search band; and
    selecting a second slice with a maximum total power from among the plurality of second slices, the selected second slice used to estimate the location of the optical axis along the second search direction.

13. The method of claim 1, further comprising:
    applying a noise filter to the plenoptic image.

14. The method of claim 1, further comprising:
    suppressing subpixels with power less than a threshold, wherein determining the location of the optical axis is based on the filtered plenoptic image with said subpixels suppressed.

15. The method of claim 14 further comprising:
determining the threshold by a dynamic histogram of the luminance values of subpixels.

16. The method of claim 1, wherein determining the location of the optical axis based on the filtered plenoptic image comprises determining the location of the optical axis based on maximum power in the filtered plenoptic image.

17. The method of claim 1, wherein the method is performed as part of a calibration process for the plenoptic imaging system.

18. The method of claim 1, wherein the predetermined object is a uniformly illuminated object without frequency components at frequencies higher than a frequency of the boundaries between superpixels.

19. A non-transitory computer-readable storage medium storing executable computer program instructions for estimating a location of an optical axis on a sensor array for a plenoptic imaging system, the plenoptic imaging system comprising imaging optics, a microlens array and the sensor array, the imaging optics characterized by the optical axis, the instructions executable by a processor and causing the processor to perform a method comprising:
  filtering a plenoptic image of a predetermined object captured by the plenoptic imaging system, the plenoptic image comprising a plurality of superpixels with each superpixel comprising a plurality of subpixels, the filtering reducing high frequency components resulting from boundaries between superpixels;
  determining the location of the optical axis based on the filtered plenoptic image;
  accessing a second plenoptic image of an object of interest; and
  processing the second plenoptic image, the processing including applying a correction factor centered on the determined location of the optical axis.

20. The non-transitory computer-readable storage medium of claim 19, wherein determining the location of the optical axis based on the filtered plenoptic image comprises:
  for a search direction, determining a search band along the search direction, the search band spanning a range of different values for the search direction;
  taking a plurality of slices of the filtered plenoptic image along a slice direction that is orthogonal to the search direction, each slice having a different value of the search direction within the search band; and
  selecting a slice with a maximum total power from among the plurality of slices, the selected slice used to estimate location of the optical axis along the search direction.

\* \* \* \* \*